United States Patent
Kao

(10) Patent No.: US 6,683,256 B2
(45) Date of Patent: Jan. 27, 2004

(54) STRUCTURE OF SIGNAL TRANSMISSION LINE

(76) Inventor: Ta-San Kao, No. 2-1, Wen Hua Rd., Tung Hu Village, Ku Keng Hsiang, Yun Lin Hsien (TW)

(*) Notice: Subject to any disclaimer, the term of this patent is extended or adjusted under 35 U.S.C. 154(b) by 0 days.

(21) Appl. No.: 10/106,353

(22) Filed: Mar. 27, 2002

(65) Prior Publication Data

US 2003/0183412 A1 Oct. 2, 2003

(51) Int. Cl.⁷ .................... H01B 7/00; H01B 11/02; H01B 7/34
(52) U.S. Cl. ............... 174/110 R; 174/34; 174/36; 174/120 R
(58) Field of Search ............ 174/102 R, 102 SC, 174/106 R, 106 SC, 34, 36, 28, 110 PM, 110 R, 110 SR, 110 FC, 120 R, 120 AR

(56) References Cited

U.S. PATENT DOCUMENTS

| | | | | |
|---|---|---|---|---|
| 3,586,751 A | * | 6/1971 | Schoerner | 174/115 |
| 3,590,141 A | * | 6/1971 | Mildner | 174/105 R |
| 4,841,259 A | * | 6/1989 | Mayer | 333/17.2 |
| 5,262,591 A | * | 11/1993 | Aldissi | 174/36 |
| 5,846,355 A | * | 12/1998 | Spencer et al. | 156/53 |
| 6,288,328 B1 | * | 9/2001 | Brake et al. | 174/28 |
| 6,417,445 B1 | * | 7/2002 | Sato et al. | 174/36 |
| 2003/0006058 A1 | * | 1/2003 | Yamamoto et al. | 174/106 R |
| 2003/0024728 A1 | * | 2/2003 | Yamamoto et al. | 174/113 R |
| 2003/0075354 A1 | * | 4/2003 | Kuss et al. | 174/120 R |

OTHER PUBLICATIONS

C & M Corporation, Jan. 1992, Engineering Design Guide (3rd Edition), pp. 2–3 and 10–14.*

* cited by examiner

Primary Examiner—William H. Mayo, III
(74) Attorney, Agent, or Firm—Troxell Law Office PLLC

(57) ABSTRACT

A structure of signal transmission line has a core portion, a middle material layer and a coating layer. The core portion includes at least one transmission medium enveloped with an insulation layer. The coating layer includes at least one layer. The middle material layer is provided between the core portion and the coating layer, and has at least a metallic-wire knitting layer and a paper wrapping layer.

6 Claims, 4 Drawing Sheets

STRUCTURE OF SIGNAL TRANSMISSION LINE

BACKGROUND OF THE INVENTION

1. Field of the Invention

The present invention is related to a structure of signal transmission line, especially to a structure of signal transmission line able to transmit signals fast, having lower radio frequency and magnetic field interference, less static electricity, lower attenuation rate and smaller distortion. It is suitable particularly for use in signal transmission lines such as those for speakers, guitar wires, microphones etc.

2. Description of the Prior Art

In conventional signal lines, conductors for transmitting signals generally are divided into the kinds of single conductors and conductors with multiple mutually entangled cores. A single conductor, for example, such as the structure of coaxial cable shown in FIG. 1, is characterized by: the insulation layer enveloping a conductor 1 is formed as a coaxial cable by combining with a cylinder member 2 made by press shaping of PE, a Mylar tape 3 made from aluminum foil, an obscuring layer 4 made by knitting copper lines and a PVC enveloping member 5.

The coaxial cable is a round PE pipe made by press shaping, in order to lower its electric capacity and attenuation rate. However, the effect of insulation of PE is not the best, and the obscuring layer is not able to make 100% obscuring, it is still a problem to be solved that the degree of mutual interference among a magnetic field, radio frequencies and static electricity is still quite high, and refraction or reflection of transmitted signals can be induced during transmission.

SUMMARY OF THE INVENTION

The primary object of the present invention is to provide a structure of signal transmission line to separately transmit signals of high and low frequencies to lower the skin effect.

The secondary object of the present invention is to provide a structure of signal transmission line able to transmit signals fast, having lower attenuation rate, smaller distortion and superior quality.

Another object of the present invention is to provide a structure of signal transmission line having the effect of reducing static electricity and lowering radio frequency and magnetic field interference.

To achieve the above stated objects, the present invention is comprised of a core portion, a middle material layer and a coating layer. The present invention is characterized by that: the core portion includes at least one transmission medium enveloped with an insulation layer; the coating layer includes at least one layer; the middle material layer is provided between the core portion and the coating layer, and is comprised of at least a metallic-wire knitting layer and a paper wrapping layer. By separated transmitting of signals of high and low frequencies with the core portion when the latter is a conductor unit with plural cores (transmission media), the skin effect is lowered; and by providing more than one obscuring layers, the degree of mutual interference among a magnetic field, radio frequencies and static electricity can be lowered, and thereby, transmission with lower attenuation rate, smaller distortion and superior quality can be obtained.

The present invention will be apparent after reading the detailed description of the preferred embodiment thereof in reference to the accompanying drawings.

DETAILED DESCRIPTION OF THE PREFERRED EMBODIMENT

Figure 1:
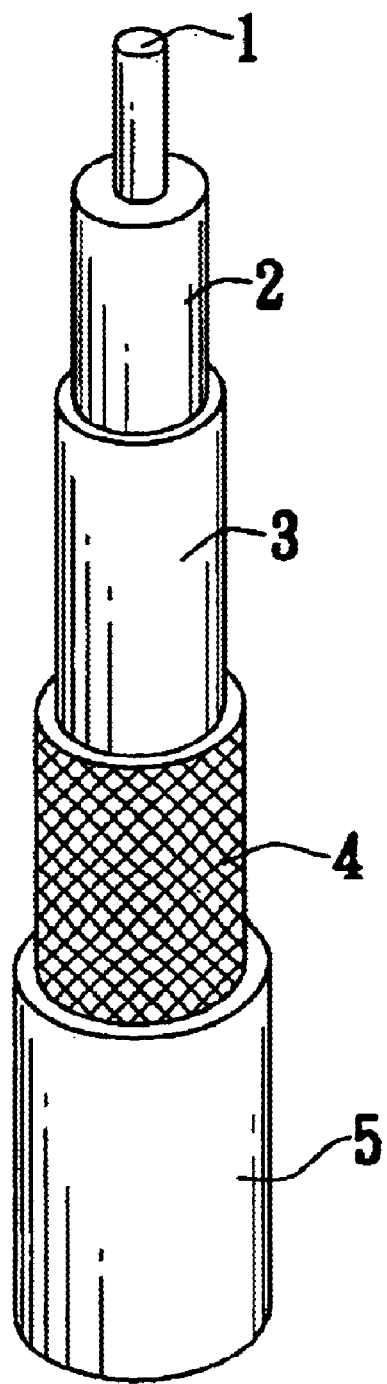
FIG. 1 is a perspective view showing the structure of a conventional signal transmission line.
Figure 2:
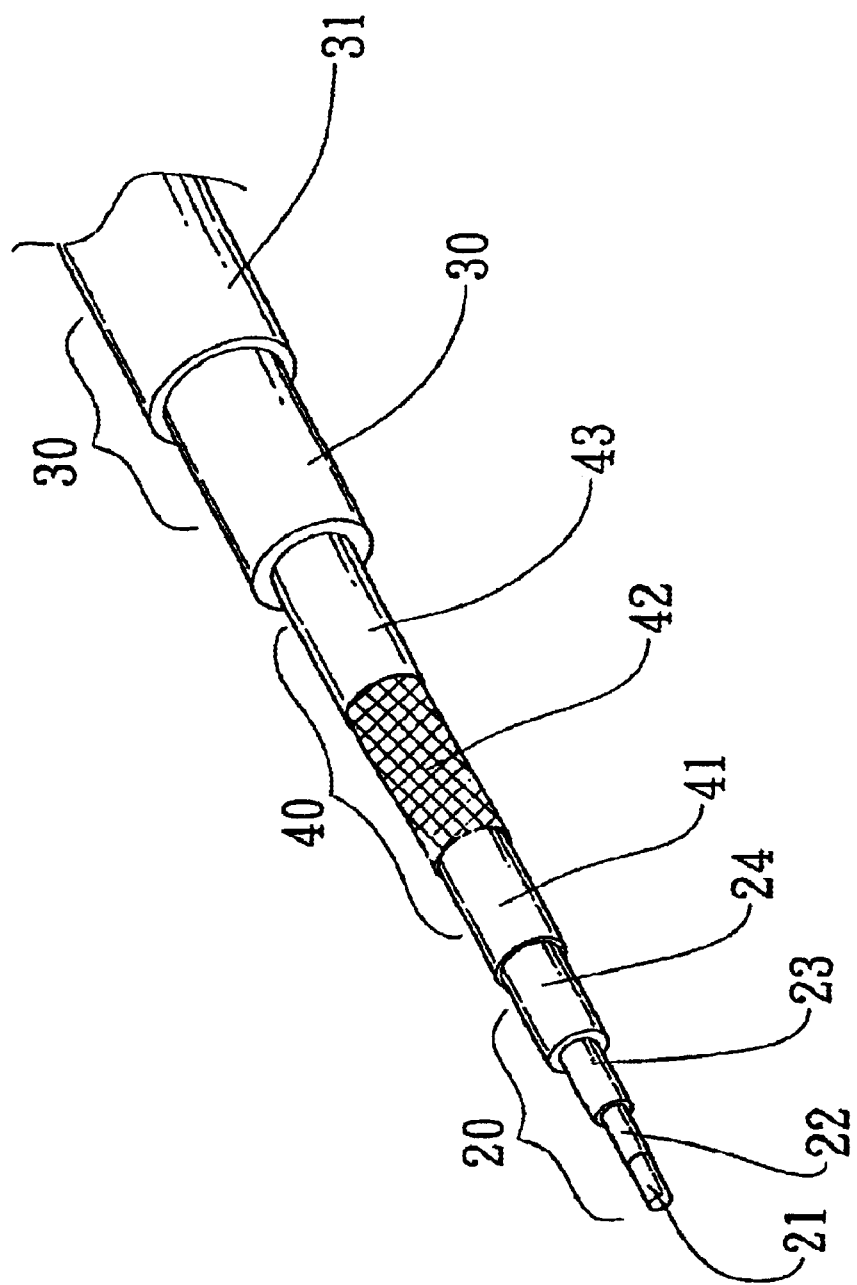
FIG. 2 is an analytical perspective view showing the structure of the first embodiment of the present invention.

Referring firstly to FIG. 2, in the first preferred embodiment of the present invention, a guitar wire is shown in a perspective view, a core 20 is formed by coating an insulation PE layer 22 over a conductor 21 made of pure silver, the insulation PE layer 22 is covered thereover with a conductor 23 made of pure copper of single crystal in single direction coated with lacquer, and a PE foam layer 24 further covers the insulation PE layer 22 to make the two conductors be insulated from each other. The PE foam layer 24 then is enveloped sequentially with a PVC conductive layer 41, a knitted layer 42 plated with silver and a paper wrapping layer 43 to form a middle material layer 40. Finally, the middle material layer 40 is enveloped with a first coating layer 30 and the second coating layer 31 made of polyvinyl chloride to complete the structure of the signal transmission line of the present invention.

Figure 3:
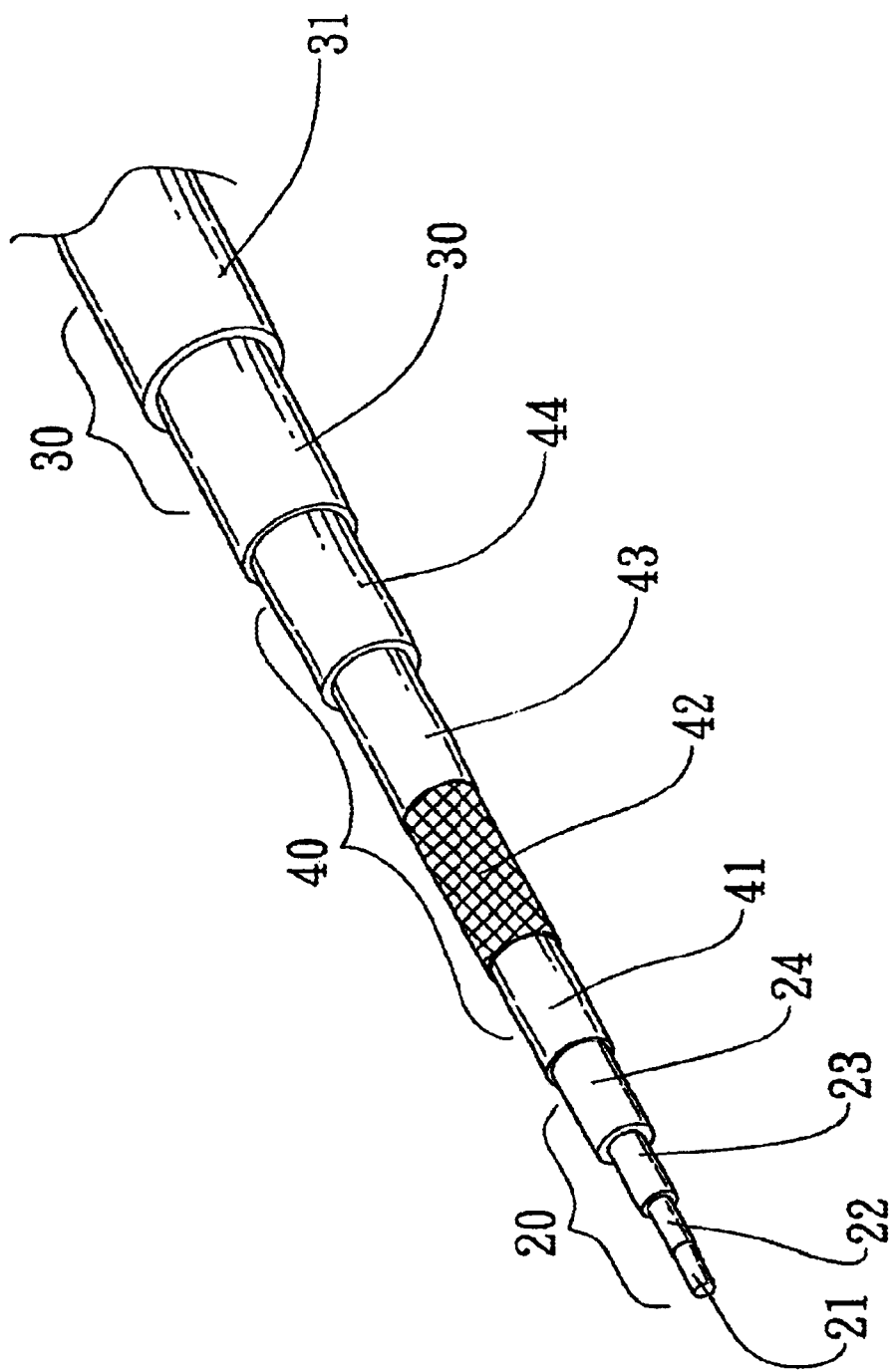
FIG. 3 is an analytical perspective view showing the structure of the second embodiment of the present invention.

As shown in FIG. 3 which shows the structure of the second preferred embodiment, namely a visual signal transmission line, of the present invention, wherein, a core 20 is formed by coating an insulation PE layer 22 over a conductor 21 made of pure silver, the insulation PE layer 22 is covered thereover with a conductor 23 made of pure copper of single crystal in single direction coated with lacquer, and a PE foam layer 24 further covers the insulation PE layer 22 to make the two conductors be insulated from each other. The PE foam layer 24 then is enveloped sequentially with a PVC conductive layer 41, a knitted layer 42 plated with silver, a foamed Teflon-tape (PTFE) wrapping layer 44 and another metallic-wire knitting layer 45 to form a middle material layer 40. Finally, the middle material layer 40 is enveloped with a first coating layer 30 and the second coating layer 31 made of polyvinyl chloride to complete the structure of the signal transmission line of the present invention.

Figure 4:
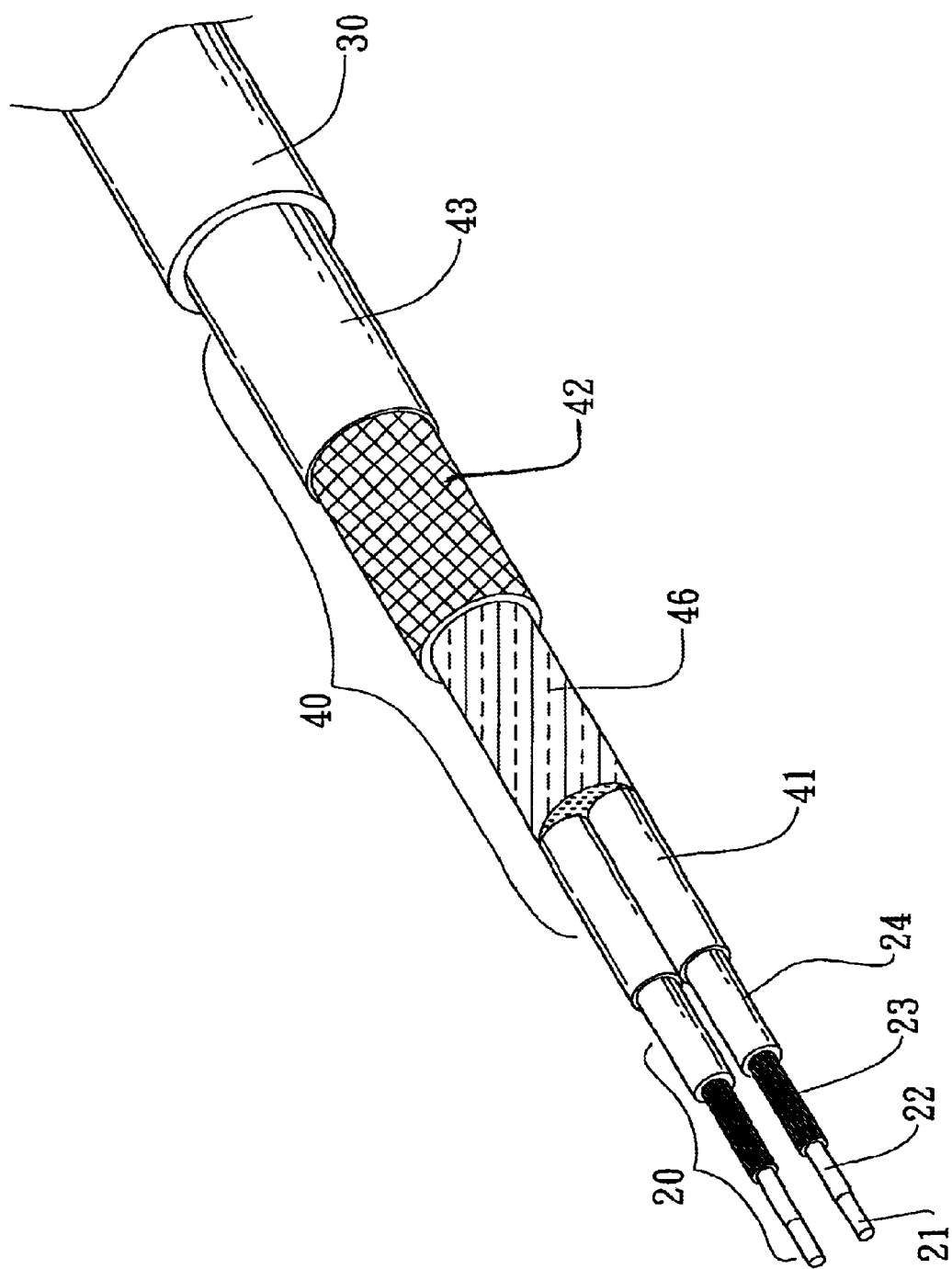
FIG. 4 is an analytical perspective view showing the structure of the third embodiment of the present invention.

Referring to FIG. 4, in the third preferred embodiment of the present invention, a microphone wire is shown, a core portion is comprised of two cores (transmission media) 20 formed each by coating an insulation PE layer 22 over a conductor 21 made of pure silver, the insulation PE layer 22 is covered thereover with a conductor 23 made of pure copper of single crystal in single direction coated with lacquer, and a PE foam layer 24 further covers the insulation PE layer 22 to make the two conductors be insulated from each other. The two cores 20 then are enveloped sequentially with two PVC conductive layers 41, a cotton yarn filled layer 46 (with this, the wire is softer and can be shaped more easier), a knitted layer 45 plated with silver and a paper wrapping layer 43 to form a middle material layer 40. Finally, the middle material layer 40 is enveloped with a first coating layer 30 made of polyvinyl chloride to complete the structure of the signal transmission line of the present invention.

It can be known from the above embodiments that, the plural-core conductors of the core portion (the conductors made of pure silver and pure copper of single crystal in single direction coated with lacquer) are respectively insulated with an insulation PE layer 22 and an insulation PE foam layer 24, in order that the two conductors are suitably separated from each other to separately transmit signals of high and low frequencies through the two conductors, so that the high and low frequencies are not interfered by each other to thereby lower the skin effect. And more, the middle material layer (including a PVC conductive layer, a knitted layer plated with silver and a PTFE layer) can have an effect of obscuring to thereby effectively prevent interference among a magnetic field, radio frequencies and static electricity, and the cotton yarn filled layer or the paper wrapping layer can increase the softness and easiness of shaping of a wire, and thereby attenuation rate of the wire can be reduced, distortion of the wire can be smaller, and quality of the wire can be better.

The cores of the plural-core conductor unit of the present invention are separately insulated, this can lower the skin effect, to render transmit signals of high and low frequencies to be transmitted separately without interfering with each other, the middle material layer can have an effect of obscuring to thereby lower interference among a magnetic field, radio frequencies and static electricity. This is innovative to wires of such kind available presently, and the effect in enhancing the functions thereof is evident.

Having thus described the technical structure of my invention with industrial value, therefore, what I claim as new and desire to be secured by Letters Patent of the United States are:

1. A signal transmission line comprising:
   a) a core portion having a transmission media including:
      i) a first conductor plated with pure silver;
      ii) a PE insulation layer covering the first conductor;
      iii) a second conductor made of pure copper of single crystal in single direction coated with lacquer, the second conductor covering the PE insulation layer; and
      iv) a PE foam layer covering the second conductor;
   b) a middle material layer formed on the core portion, the middle material layer having:
      i) a PVC conductive layer;
      ii) a metallic-wire knitted layer; and
      iii) a paper wrapping layer; and
   c) at least one coating layer formed on the middle material layer.

2. The signal transmission line according to claim 1, wherein the metallic-wire knitted layer is coated with silver.

3. A signal transmission line comprising:
   a) a core portion having a transmission media including:
      i) a first conductor plated with pure silver;
      ii) a PE insulation layer covering the first conductor;
      iii) a second conductor made of pure copper of single crystal in single direction coated with lacquer, the second conductor covering the PE insulation layer; and
      iv) a PE foam layer covering the second conductor;
   b) a middle material layer formed on the core portion, the middle material layer having:
      i) a PVC conductive layer;
      ii) a first metallic-wire knitted layer;
      iii) a PTFE layer; and
      iv) a second metallic-wire knitted layer; and
   c) at least one coating layer formed on the middle material layer.

4. The signal transmission line according to claim 3, wherein the first and second metallic-wire knitted layers are coated with silver.

5. A signal transmission line comprising:
   a) a core portion having two transmission media, each transmission media including:
      i) a first conductor plated with pure silver;
      ii) a PE insulation layer covering the first conductor;
      iii) a second conductor made of pure copper of single crystal in single direction coated with lacquer, the second conductor covering the PE insulation layer; and
      iv) a PE foam layer covering the second conductor;
   b) a middle material layer formed on the core portion, the middle material layer having:
      i) two PVC conductive layers;
      ii) a cotton yarn filled layer;
      iii) a metallic-wire knitted layer; and
      iv) a paper wrapping layer; and
   c) at least one coating layer formed on the middle material layer, such the two transmission media transmit signals of high and low frequencies separately.

6. The signal transmission line according to claim 5, wherein the metallic-wire knitted layer is coated with silver.

* * * * *